United States Patent
Mullis, II et al.

(10) Patent No.: US 8,799,521 B2
(45) Date of Patent: Aug. 5, 2014

(54) SYSTEM AND METHOD FOR RECEIVING CONTROL COMMANDS AT A PERIPHERAL DEVICE

(75) Inventors: Samuel L. Mullis, II, Raleigh, NC (US); Philip Elcan, Hillsborough, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1739 days.

(21) Appl. No.: 11/838,933

(22) Filed: Aug. 15, 2007

(65) Prior Publication Data

US 2008/0126584 A1    May 29, 2008

Related U.S. Application Data

(63) Continuation-in-part of application No. 11/564,553, filed on Nov. 29, 2006, now Pat. No. 8,171,502.

(60) Provisional application No. 60/944,237, filed on Jun. 15, 2007.

(51) Int. Cl.
*G06F 3/00* (2006.01)
*G06F 13/10* (2006.01)
*G06F 3/06* (2006.01)
*G06F 9/44* (2006.01)

(52) U.S. Cl.
CPC ............ *G06F 13/102* (2013.01); *G06F 3/0667* (2013.01); *G06F 9/4413* (2013.01)
USPC .......... 710/5; 710/8; 710/14; 710/62; 710/72; 710/73; 710/74

(58) Field of Classification Search
USPC ................................................ 710/5, 6, 8, 14
See application file for complete search history.

(56) References Cited

U.S. PATENT DOCUMENTS

| | | | | |
|---|---|---|---|---|
| 6,018,779 A | * | 1/2000 | Blumenau | 710/68 |
| 6,185,521 B1 | | 2/2001 | Vishlitzky | 703/26 |
| 6,493,811 B1 | * | 12/2002 | Blades et al. | 711/203 |
| 6,754,725 B1 | * | 6/2004 | Wright et al. | 710/8 |
| 7,237,046 B2 | * | 6/2007 | Paley et al. | 710/38 |
| 7,412,544 B2 | * | 8/2008 | Gibson et al. | 710/8 |
| 7,966,355 B2 | * | 6/2011 | Sherman et al. | 707/824 |
| 2003/0046447 A1 | * | 3/2003 | Kouperchliak et al. | 709/321 |
| 2003/0204950 A1 | * | 11/2003 | Chou et al. | 29/854 |
| 2004/0193744 A1 | * | 9/2004 | Paley et al. | 710/5 |
| 2004/0199721 A1 | * | 10/2004 | Chen | 711/115 |
| 2006/0117136 A1 | | 6/2006 | Tran et al. | 711/112 |
| 2008/0195797 A1 | * | 8/2008 | Sherman et al. | 711/103 |

(Continued)

OTHER PUBLICATIONS

'Huawei Launches the World's Smallest and Fastest HSDPA USB Modem' from www-cnc.huawei.com.*

(Continued)

*Primary Examiner* — Steven Snyder
(74) *Attorney, Agent, or Firm* — Coats & Bennett, PLLC

(57) ABSTRACT

A peripheral device includes a file system manager, a command interpreter, and a controller. The peripheral device receives file access commands from a host device. The file system manager determines if the file access commands have embedded control commands and, if so, extracts the control commands. The file system manager sends the control commands to the command interpreter. Based on analyzing the commands, the command interpreter causes the controller to perform a selected function at the peripheral device.

11 Claims, 3 Drawing Sheets

(56) References Cited

U.S. PATENT DOCUMENTS

2010/0064063 A1* 3/2010 Deforche et al. ................. 710/5
2011/0040809 A1* 2/2011 Spanier et al. ................. 707/821
2011/0314068 A1* 12/2011 Sherman et al. .............. 707/824
2013/0055352 A1* 2/2013 Fang et al. ........................ 726/3
2013/0055353 A1* 2/2013 Fang et al. ........................ 726/3

OTHER PUBLICATIONS

International Search Report, International Application No. PCT/US2007/085865, Date of Mailing: Mar. 20, 2008.

* cited by examiner

SYSTEM AND METHOD FOR RECEIVING CONTROL COMMANDS AT A PERIPHERAL DEVICE

RELATED APPLICATIONS

This application claims the benefit of U.S. Provisional Patent Application 60/944,237, filed Jun. 15, 2007, and is a continuation-in-part application of co-pending U.S. application Ser. No. 11/564,553, filed on Nov. 29, 2006. Both the '237 application and the '553 application are incorporated herein by reference.

BACKGROUND

The present invention relates generally to peripheral devices, and particularly to methods of receiving control commands at peripheral devices.

Host computers and other electronic devices can connect to a wide variety of peripheral devices using a Universal Serial Bus (USB) interface. Mass storage devices, communication cards, MP3 players, and printers are but a few examples of USB compatible devices. The USB interface, which is well-known in the art, allows peripheral devices to employ standard connectors, and to be connected and disconnected to the host device without re-booting the host device. USB interfaces may also provide some peripheral devices with an external source of power.

To operate, USB-compatible peripheral devices require one or more device drivers to be installed on the host device. A device driver is a software program that allows an operating system on the host device to communicate with the USB peripheral device. Although most operating systems include generic device drivers that facilitate communication with a wide array of peripheral devices, they typically do not support all peripheral devices. For example, some peripheral devices are capable of performing special functions and, thus, may require special device drivers to extend their capabilities. Therefore, users may need to load proprietary device drivers provided by the manufacturer of the peripheral device to operate the peripheral device. Manufacturers often distribute such special device drivers on Compact Disks (CDs), or make them available for download over the Internet.

There are circumstances where it may be desirable to send commands from a host device to a peripheral device using generic WINDOWS class drivers. For example, manufacturers may store the specialized device drivers in a memory on the peripheral device itself. When the user connects the peripheral device to the host, the peripheral device may initially present itself as mass storage device to avoid unknown device errors until the proper drivers are installed. An "autorun" program stored in the peripheral device memory automatically executes to install the device drivers on the host device. Once the correct drivers are installed, the host device can issue a command to the peripheral device to switch to a normal mode. It would be convenient to use the generic WINDOWS class drivers for a mass storage device to send the switch mode command.

SUMMARY

The present invention relates to a method and apparatus for sending commands from a host device and receiving them at a peripheral device. The commands may be used, for example, by the host device to control the peripheral device to perform selected functions. The peripheral device includes a memory for storing files and a file system manager for controlling access to files stored in the memory. The host device formats control commands as file access commands that target a predetermined virtual file. Upon receipt, the peripheral device recognizes these virtual file access commands and performs the associated function. Thus, control commands disguised as virtual file access commands can be used to perform functions that are not associated with conventional file operations. Such functions include, but are not limited to, exposing various interfaces on the peripheral device and switching between two or more operating modes.

In one exemplary embodiment, control commands for the peripheral device are embedded or encapsulated in virtual file access commands. The file system manager recognizes virtual file access commands containing embedded control commands. When a virtual file access command with an embedded control command is detected, the control command is extracted and passed to a command interpreter. Thus, conventional file commands, such as read and write commands, can be used to send control commands to the peripheral device. The ability to send control commands as file access commands permits standard WINDOWS class drivers to be used to communicate with and control peripheral devices.

In one embodiment, the peripheral device connects to the host device using a well-known interface, such as a Universal Serial Bus (USB) interface, and comprises a memory for storing files, a file system manager for controlling access to files stored in memory, and a modem. The peripheral device defaults to a mass storage device configuration when it is initially connected to the host device. The peripheral device is instructed to switch between this default configuration and a standard configuration by embedding a control command to the peripheral device in a virtual file access command.

DETAILED DESCRIPTION

The present invention relates to a peripheral device for a host device, and to a method of receiving control commands at the peripheral device. The commands are embedded in file access commands sent by the host device, and may be used to control the peripheral device to perform a selected function. By way of example, the peripheral device may be controlled to switch between two or more operating modes, or to perform selected functions based on the embedded control commands received from the host device.

Figure 1:
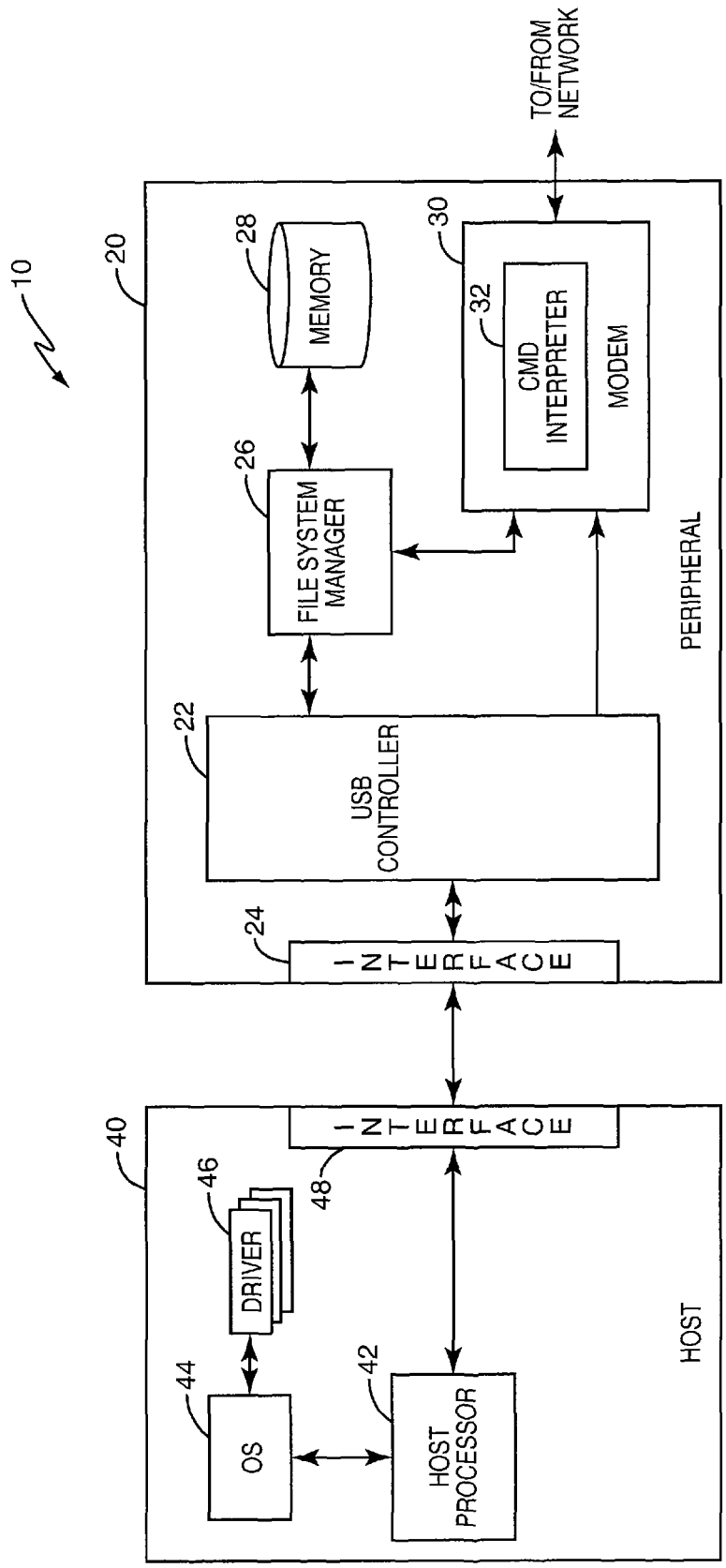
FIG. 1 is a block diagram of a host and a peripheral device according to one embodiment of the present invention.

FIG. 1 illustrates a system 10 suitable for use with one embodiment of the present invention. System 10 comprises a peripheral device 20 and a host device 40. Generally, the peripheral device 20 connects to and operates under the control of host device 40. In this embodiment, peripheral device 20 comprises a modem card and host device 40 comprises a computing device that provides a user with the capability to communicate with remote parties via a wireless network (not shown). However, these particular labels and their associated functions are for illustrative purposes only. Peripheral device 20 may comprise any peripheral known in the art such as a mass storage device, am MP3 player, or the like. Similarly, host device 40 may be any type of electronic or computing device including, but not limited to, laptop and notebook computers, cellular telephones, satellite phones, and Personal Digital Assistants (PDAs).

Host device 40 comprises a host processor 42, an operating system (OS) 44, one or more device drivers 46, and a peripheral device interface 48 to communicatively connect host device 40 to peripheral device 20. The host processor 42 controls the operation of host device 40 according to the instructions and data associated with OS 44. The host processor 42 may comprise one or more microprocessors, microcontrollers, hardware circuits, firmware, or a combination thereof. OS 44 comprises a set of computer programs stored in memory of the host device 40 that manage the hardware and software resources of the host device 40. As is known in the art, the OS 44 typically processes system input and user input, and performs basic computing tasks. Such tasks include controlling and allocating memory, prioritizing system requests, facilitating networking, and managing file systems. OS 44 may be any operating system known in the art; however, some of the most popular include WINDOWS, NT, LINUX, UNIX, and MAC OS X.

The device drivers 46 are software programs stored in memory that permit host device 40 to communicate with and control peripheral devices 20. In the exemplary embodiment, peripheral device 20 can function as a modem 30. As such, device drivers 46 may include one or more modem device drivers to communicate with the modem 30. As described in more detail below, the peripheral device 20 may also emulate a USB-compatible mass storage device. Therefore, the device drivers 46 may also include a mass storage device driver to communicate with the peripheral device 20 as a mass storage device. Some operating systems may provide standard or generic device drivers so that host device 40 may communicate with a wide array of USB-compatible mass storage devices. As described below, the host device 40 can use these standard device drivers to send embedded control commands to peripheral device 20.

The peripheral device interface 48 enables communication between the host device 40 and peripheral device 20. The peripheral device interface 48 may comprise any known type of interface, such as a USB interface, FIREWIRE interface, or other type of serial or parallel interface.

The peripheral device 20 comprises a modem 30 to enable the host device 40 to communicate with other devices. Modem 30 allows the user of the host device 40 to communicate with one or more remote parties and/or servers via a communication network (not shown). If host device 40 has the appropriate modem device drivers installed, host device 40 can send and receive data with modem 30 via the USB controller 22.

As described in application Ser. No. 11/564,553 titled "Methods, Devices and Computer Program Products for Automatically Installing Device Drivers from a Peripheral Device onto a Host Computer" filed on Nov. 29, 2006, the peripheral device 40 may initially present itself as a mass storage device to avoid unknown device errors until the proper drivers are installed. An "autorun" program stored in the peripheral device memory 28 can be automatically executed to install the device drivers on the host device 40. Once the correct drivers are installed, the USB controller 22 can change from the default configuration (e.g., mass storage device) to a standard configuration (e.g., modem configuration).

The peripheral device 20 further comprises a USB controller 22 connected to an interface 24, a file system manager 26, and memory 28. USB controller 22 controls the operation of peripheral device 20. USB controller 22 may comprise a microprocessor, microcontroller, hardware circuits, or a combination thereof. One function of the USB controller 22 is to change the configuration of the peripheral device 20. For example, when the peripheral device 20 is connected for the first time to host device 40, the USB controller 23 may configure the peripheral device 20 as a mass storage device to avoid unknown device errors until the proper drivers are installed. After appropriate drivers are installed in the host device 40, the USB controller 22 may reconfigure the peripheral device to operate as a modem.

The file system manager 26 is a software module that controls access to memory 28. Particularly, file system manager 26 receives and processes file access commands from host device 40. The file system manager 26 can operate in a conventional fashion to read open and close files, read files, write files, delete files, etc. The file access command may have the following syntax:

<COMMAND> [filename,parameter 1, . . . , parameter n]. The "COMMAND" portion of the file access command comprises a command term (e.g., READ, WRITE, OPEN, etc.) followed by the name of a target file, and one or more parameters. The parameters required may vary depending on the type of the file access command and some parameters may be optional. For example, the command WRITE(somefile.txt, "someletters") causes the character string "someletters" to be written to the text file named somefile.txt.

According to the present invention, control commands can be sent from the host device 40 to the peripheral device 20 as file access commands. The modem 30 in the peripheral device 20 may include command interpreter 32 to parse and interpret commands passed to it by the file system manager 26. The file system manager 26 can be programmed to recognize certain file access commands as being related to control functions and to process such commands differently from normal file access commands. For example, the file access commands referencing a predetermined "virtual" file may include embedded or encapsulated control commands directed to the modem 30 or USB controller 22. Using this method, standard AT commands for Hayes compatible modems can be embedded as write data in a WRITE command targeting the predetermined virtual file. As another example, file access commands directed to a predetermined virtual file could be associated with specific actions. The corresponding actions can be stored in a table in memory 28. When the predetermined virtual file is referenced in a file access command, the predetermined action associated with the command is performed. Thus, an OPEN command targeting the predetermined virtual file can be used to switch the peripheral device from the default configuration (e.g., mass storage device) to a standard configuration (e.g. modem configuration). Different virtual files can be used to implement different functions.

Figure 2:
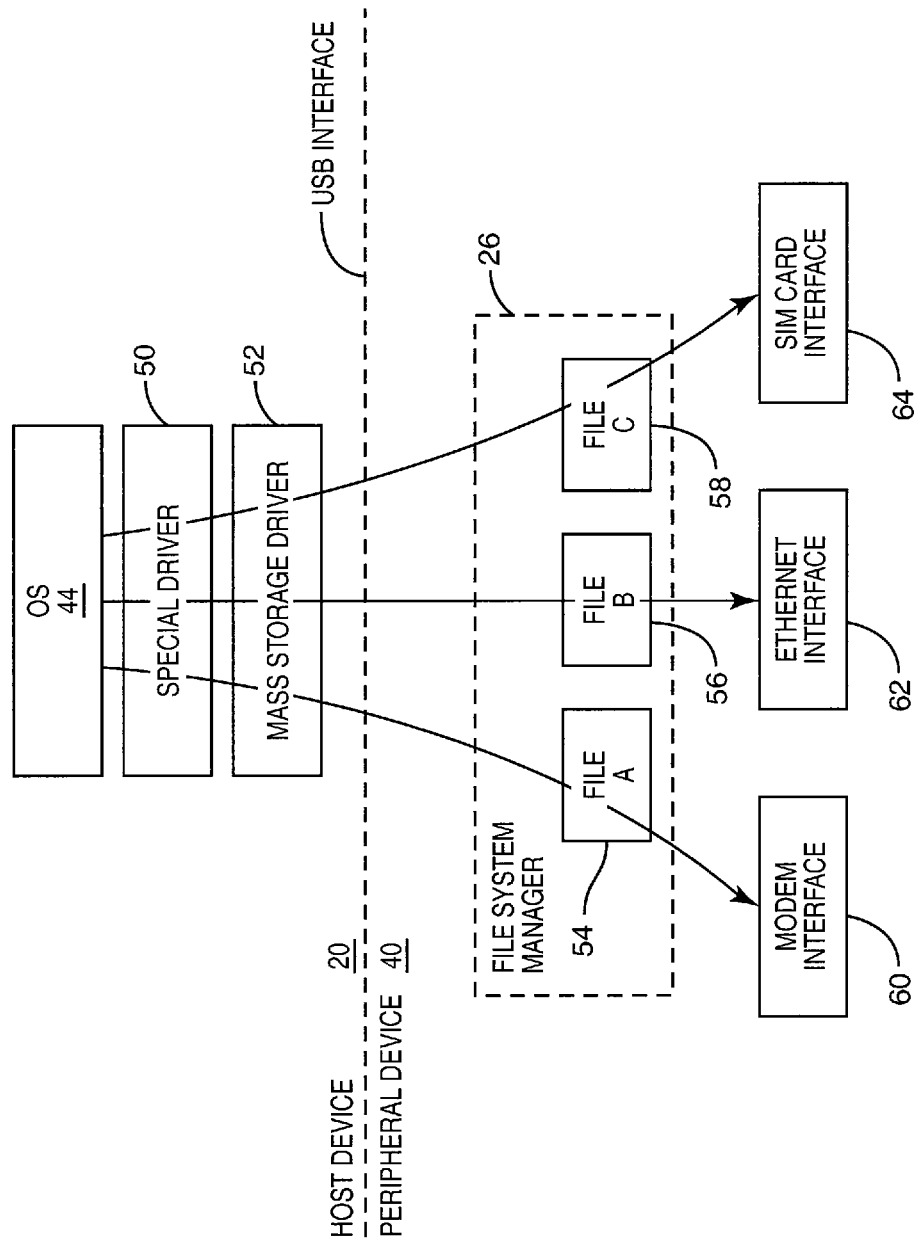
FIG. 2 is a conceptual drawing illustrating a method of exposing different peripheral device interfaces according to one embodiment of the present invention.

As seen in FIG. 2, for example, virtual files may further be used to expose different interfaces of the peripheral device 20 to applications or the operating system on the host device 40. An example would be a USB wireless modem device. A special driver 50 could be installed on the host OS 44 that would use the USB Mass Storage driver 52 to access different "virtual" files. A first virtual file 54 could implement a modem interface 60 and be connected to the AT command parser 32 in the wireless modem 30. This would allow the special driver 50 on the host device 40 to expose the modem interface 60 to the host OS 44. A second virtual file 56 could represent an Ethernet device allowing the special driver 50 to expose an Ethernet interface 62 to the host OS 44. A third virtual file 58 could provide access to a SIM card in the wireless modem 30 allowing the special driver 50 to expose a smartcard interface 64 to the host OS 44.

Upon receipt of a file access command, the file system manager 26 determines whether the received file access command includes one or more embedded control commands. If not, the file system manager 26 simply processes the file access command as is conventional. If the file access command include an embedded control command, the file system manager 26 extracts the control command and forwards it to the command interpreter 32 for further processing.

The command interpreter 32 analyzes commands passed to it by the file system manager 26 and, based on the results, generates signals to control operation of the modem 30. As an example, Hayes compatible AT commands can be sent as file access commands by including the AT commands as the "write" data in a WRITE command that references a predetermined virtual file. As another example, the host device 40 can send a command to the peripheral device 20 to cause the peripheral device to change configuration following installation of drivers for the modem 30. In one embodiment, the command interpreter 32 generates a signal to switch the operating mode of peripheral device 20 responsive to the commands passed by the file system manager 26. For example, the command interpreter 32 may cause the USB controller 22 to selectively switch the peripheral device 20 between operating as a communication device and as a mass storage device.

Figure 3:
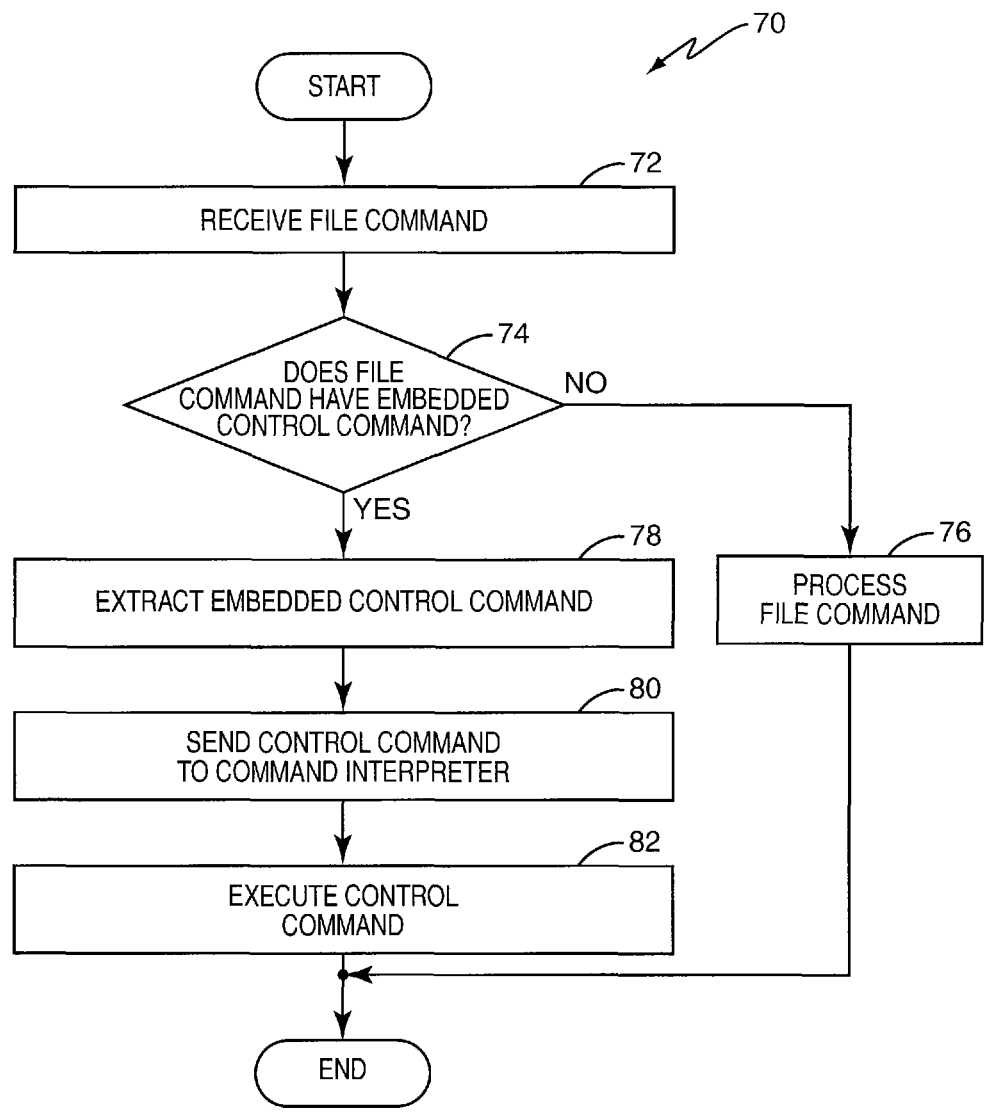
FIG. 3 is a flow diagram that illustrates a method of receiving commands at a peripheral device according to one embodiment of the present invention.

FIG. 3, illustrates one exemplary method 70 for sending embedded control commands from the host device 40 to the peripheral device 20 as file access commands. Method 50 begins when peripheral device 20 receives a file access command from host device 40 (box 72). The file system manager 26 analyzes the received file access command to determine whether the file access command includes embedded control commands (box 74). For example, the file system manager 26 may be configured to treat file access commands referencing a particular virtual file as control commands.

If the file access command does not include an embedded control command, the file system manager 26 will conventionally process the file command and the process ends (box 76). For example, the file system manager 26 may open a file for reading in response to an OPEN command, so long as that command does not include any embedded control commands. If, however, the file access command does include an embedded command, the file system manager 56 extracts the control command (box 78). The file system manager 26 then forwards the extracted command to the command interpreter 32 for further processing (box 80). As stated previously, the command interpreter 32 may generate one or more signals to the USB controller 22 to control the operation of peripheral device 20 based on the received embedded commands (box 82).

The methods described for sending commands can be used, for example, as part of a driver installation routine. Manufacturers may store the specialized device drivers for the peripheral device 20 in memory on the peripheral device 20. When the user first connects the peripheral device 20 to the host device 40, the peripheral device 20 may initially present itself as mass storage device to avoid unknown device errors until the proper drivers are installed. The host processor 42 on host device 40 may automatically execute an "autorun" program stored in the peripheral device to install the proper device drivers on the host device 40. Once the correct drivers are installed, the host device 40 can issue a command to the peripheral device 20 to switch from the default configuration (e.g. mass storage device configuration) to a standard configuration (e.g. modem configuration). Because the peripheral device 20 is configured as a mass storage device, it may not response properly to command from the newly installed driver. However, a generic device driver for a mass storage device can be used to send the switch mode command to the peripheral device 20 as a file access command as described above.

The present invention may, of course, be carried out in other ways than those specifically set forth herein without departing from essential characteristics of the invention. For example, the above embodiments specifically describe the file system manager 26 as supporting a "WRITE" file access command. However, the present invention is not so limited, and may also be configure to support other file access commands such as "OPEN," "CLOSE," "READ," "PRINT," "COPY," "DELETE," "MOVE," "FIND," and the like. The file system manager 26 could be configured to recognize one or more of these file access commands as having embedded control commands.

Those skilled in the art will appreciate that this list of commands and functions is not exhaustive, and that the file system manager 26 may support other file operations and access commands not specifically stated here. Accordingly, the present embodiments are to be considered in all respects as illustrative and not restrictive, and all changes coming within the meaning and equivalency range of the appended claims are intended to be embraced therein.

What is claimed is:

1. A method of passing commands to a modem in a peripheral device, the method comprising:
    detecting, by a peripheral device, a file access command having an embedded modem command, wherein the file access command is formatted to perform a file operation on a predetermined virtual file at the peripheral device;
    extracting the modem command from the file access command to control a modem function; and
    passing the modem command to the modem to perform the modem function.

2. The method of claim 1 wherein passing the modem command comprises directing the extracted modem command to a command interpreter at the modem and generating control signals to execute the modem command.

3. The method of claim 2 wherein the modem function comprises switching a configuration of the peripheral device from a default configuration to a modem configuration.

4. The method of claim 2 wherein the modem function comprises exposing a modem interface on the peripheral device.

5. The method of claim 2 wherein the file access command causes the peripheral device to expose a first modem interface to the host device, and further comprising:
    detecting, by the peripheral device, a second file access command having an embedded control command;
    extracting the control command from the second file access command; and
    exposing a second communication interface at the peripheral device responsive to the control command extracted from the second file access command.

6. A peripheral device including a modem, the peripheral device comprising:
    a modem to communicate data with remote devices over a communication network;
    an interface to connect the peripheral device to a host device;

a file system manager configured to:
- detect a file access command having an embedded modem command by determining whether the file access command targets a predetermined virtual file at the peripheral device;
- extract the modem command from the file access command to control a modem function; and a command interpreter in the modem, and configured to:
- receive the modem command from the file system manager; and
- process the modem command to perform the modem function.

7. The peripheral device of claim 6 further comprising a peripheral device controller and wherein the command interpreter generates a control signal for the peripheral device controller based on said modem command.

8. The peripheral device of claim 6 wherein the modem function comprises switching a configuration of the peripheral device from a default configuration to a modem configuration.

9. The peripheral device of claim 6 wherein the modem comprises a first communication interface, and further comprising a second communication interface to connect the peripheral device to first and second different communication networks, respectively.

10. The peripheral device of claim 9 wherein the command interpreter is configured to:

- expose the first interface to the host device responsive to the modem command embedded in the file access command; and
- expose the second interface to the host device responsive to a control command embedded in a second file access command received at the peripheral device.

11. The method of claim 1 wherein the modem command controls the peripheral device to upload a modem driver stored in a memory at the peripheral device to a host device.

* * * * *